UNITED STATES PATENT OFFICE 2,260,740

ARYLOXY ALKYL ESTERS OF CINNAMIC ACID

Gerald H. Coleman and Bartholdt C. Hadler, Midland, Mich., assignors to The Dow Chemical Company, Midland, Mich., a corporation of Michigan No Drawing. Application January 23, 1941, Serial No. 375,623

8 Claims. (Cl. 260—476)

This invention concerns esters of certain aryloxy alcohols and cinnamic acid, and particularly relates to cinnamic acid esters having the general formula

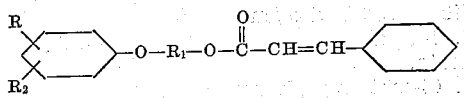

wherein R represents an alkoxy substituent; $R_1$ represents a lower alkylene radical containing at least 2 carbon atoms, i. e. a bivalent aliphatic hydrocarbon radical containing from 2 to 6 carbon atoms in which the free valences are borne by different carbon atoms; and $R_2$ represents a member of the group consisting of the alkyl, alkenyl, and cycloalkyl radicals and hydrogen. All such esters are new compounds useful as plasticizing and modifying agents for vinyl resins, e. g. polystyrene, and cellulose derivatives, e. g. ethyl cellulose, cellulose acetate, etc.

The cinnamic acid esters of the present class are conveniently prepared by esterifying an aryloxy alcohol in which the aryl group is substituted by an alkoxy substituent such as 2-(3-methoxy-phenoxy)-ethanol. The reaction is carried out by heating the aryloxy alcohol with approximately one molecular equivalent of cinnamic acid at a temperature of about 60–130° C. until reaction is complete. If desired, a small proportion of an esterification catalyst, e. g. 0.01–0.05 molecular equivalents of a strong acid such as sulfuric or benzene sulfonic acid may be employed. Also if desired, a water-immiscible organic liquid such as benzene or toluene may be added to the reaction mixture for the purpose of promoting distillation and removal of water from the reaction mixture. Upon completion of the reaction, the mixture is treated with sufficient alkali to neutralize any free acid contained therein, washed with water, and the ester product is separated and purified by fractional distillation or crystallization.

The following examples are illustrative of the preparation of the esters of the present class but are not to be construed as limiting the invention:

Example 1

A mixture of 182 grams (1 mol) of a mixture of isomeric (2-methoxy-phenoxy) propanols (the reaction product of propylene chlorhydrin and 2-methoxy phenol), 163 grams (1.1 mols) of cinnamic acid, and 7.5 grams (0.05 mol) of benzene sulfonic acid was heated at 92°–130° C. for 18 hours in a flask fitted with a dropping funnel, condenser, and receiver arranged in such manner as to permit distillation of water from the mixture during the heating. 300 cc. of benzene was added slowly through the dropping funnel to facilitate the distillation of water. Upon completion of the reaction the mixture was cooled, dissolved in benzene, and washed successively with a dilute aqueous sodium bicarbonate solution and water. Benzene was removed by distillation and the ester product was separated and purified by fractional distillation under vacuum, whereby there was obtained a mixture of isomeric (2-methoxy-phenoxy) propyl cinnamates; a pale yellow liquid which distills at approximately 200° C. under 1 millimeter pressure, has a specific gravity at $$\frac{25°}{25°} \text{ of } 1.140$$

partially crystallizes on standing, and may be represented by the formula

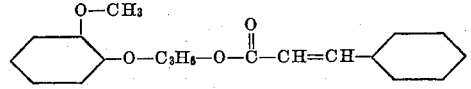

Example 2

A mixture of 208 grams (1 mol) of 2-(4-allyl-2-methoxy-phenoxy) ethanol, 163 grams (1.1 mols) of cinnamic acid, 7.5 grams (0.05 mol) of benzene sulfonic acid, and 250 cc. of benzene was heated at a temperature of about 101°–109° C. for 8 hours while removing water as in Example 1. Benzene was removed by distillation and the ester product was separated and purified by fractional distillation under vacuum. There was obtained 2-(4-allyl-2-methoxy-phenoxy) ethyl cinnamate; a straw-colored viscous liquid having a specific gravity at $$\frac{25°}{25°} \text{ of } 1.1310$$

and a boiling point of about 235°–240° C. under 1 millimeter pressure, and having the formula

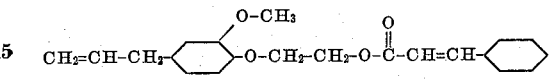

Other aryloxy alcohols which may be reacted with cinnamic acid in a similar manner to prepare the new esters of the present class include 3-(4-isopropoxy-phenoxy)-propanol, 2-(methyl-2-methoxy-phenoxy) ethanol, 2-(cyclohexyl-2-methoxy-phenoxy) ethanol, (2-methoxy-phenoxy) pentanol, etc.

This application is a continuation-in-part of our co-pending application Serial No. 321,315, filed February 28, 1940, which, in turn, is a continuation-in-part of our application Serial No. 177,655, filed December 1, 1937.

We claim:

1. An aryloxy-alkyl ester of cinnamic acid having the general formula

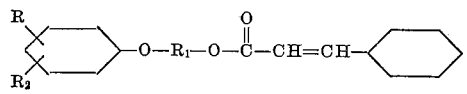

wherein R represents an alkoxy substituent; $R_1$ represents a lower alkylene radical containing at least 2 carbon atoms; and $R_2$ represents a member of the group consisting of the alkyl, alkenyl, and cycloalkyl radicals and hydrogen.

2. An aryloxy-alkyl ester of cinnamic acid having the general formula

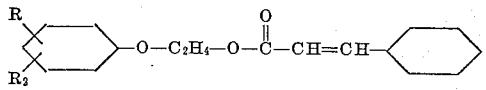

wherein R represents an alkoxy substituent and $R_2$ represents a member of the group consisting of the alkyl, alkenyl, and cycloalkyl radicals and hydrogen.

3. An aryloxy-alkyl ester of cinnamic acid having the general formula

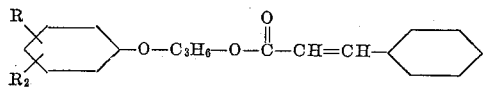

wherein R represents an alkoxy substituent and $R_2$ represents a member of the group consisting of the alkyl, alkenyl, and cycloalkyl radicals and hydrogen.

4. An aryloxy-alkyl ester of cinnamic acid having the general formula

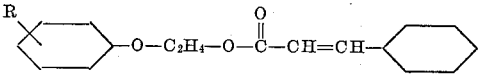

wherein R represents an alkoxy substituent.

5. An aryloxy-alkyl ester of cinnamic acid having the general formula

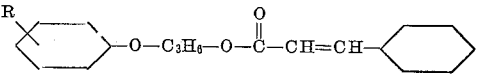

wherein R represents an alkoxy substituent.

6. An aryloxy-alkyl ester of cinnamic acid having the general formula

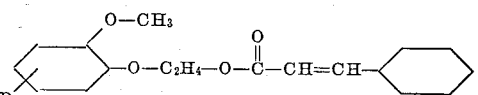

wherein $R_2$ represents a member of the group consisting of the alkyl, alkenyl, and cycloalkyl radicals and hydrogen.

7. 2-(4-allyl-2-methoxy-phenoxy)-ethyl cinnamate.

8. (2-methoxy-phenoxy)-propyl cinnamate.

GERALD H. COLEMAN.
BARTHOLDT C. HADLER.